Jan. 18, 1949.  G. R. NEUMANN ET AL  2,459,575
HEATING DEVICE
Filed Nov. 5, 1943  6 Sheets-Sheet 1

Fig.1

Inventors:
George R. Neumann
Eugene F. Farrell
By: Edward C. Fitzbaugh
Atty.

Jan. 18, 1949.   G. R. NEUMANN ET AL   2,459,575
HEATING DEVICE

Filed Nov. 5, 1943   6 Sheets—Sheet 3

Inventors:
George R. Neumann
Eugene F. Farrell
By: Edward C. Gutzbaugh
Atty.

Jan. 18, 1949.   G. R. NEUMANN ET AL   2,459,575
HEATING DEVICE

Filed Nov. 5, 1943   6 Sheets-Sheet 5

Fig.6

Inventors:
George R. Neumann
Eugene F. Farrell
By: Edward C. Fitzhaugh

Jan. 18, 1949.  G. R. NEUMANN ET AL  2,459,575
HEATING DEVICE

Filed Nov. 5, 1943  6 Sheets-Sheet 6

Fig. 7

Inventors:
George R. Neumann
Eugene F. Farrett
By: Edward C. Fitzhugh
Atty.

Patented Jan. 18, 1949

2,459,575

UNITED STATES PATENT OFFICE 2,459,575

HEATING DEVICE

George R. Neumann, St. Clair Shores, and Eugene F. Farrell, Grosse Pointe Woods, Mich., assignors to Borg-Warner Corporation, Chicago, Ill., a corporation of Illinois Application November 5, 1943, Serial No. 509,076

6 Claims. (Cl. 237—12.1)

1

This invention relates primarily to a heating device. Certain improvements, concerned with embodiments of features comprising parts of this invention are covered in separate Patents Nos. 2,393,703 and 2,420,757, granted January 29, 1946, and May 20, 1947, respectively.

More particularly, this invention relates to a new and novel combination of a heat exchanger and power means. It is an object to produce a self-contained and self-powered heater.

It is a further object to produce a self-contained and self-powered heater in which air may be blown through ducts or if desired into space, even though such air is directed against considerable static resistance.

Another object is to disclose such a combination of self-contained and self-powered heater wherein the power means and the heater have a common fuel means providing fuel for both, and independent air fuel ratio controls for each.

It is an object to disclose an arrangement wherein there is combined with the heat exchangers a two-cycle internal combustion engine having what may be termed a "stepped piston" and a cylinder having a two diameter or stepped bore for accommodating the piston, the purpose of the stepped piston and bore being to provide compressed air for use in the combustion of the fuel both in the engine and the heat exchanger. In connection with the above, it is pointed out that applicant has provided a combination engine and pump in one integral unit. In this connection, it is an object to provide a construction in which the air charging means for both the prime mover and the heat exchanger is the piston in the cylinder bore of the prime mover; and in this connection, it is an object to eliminate the need for separate compressors and thereby eliminate the drag of extra mechanism on the engine and also eliminate considerable added weight of a separate compressor. This is a particularly important feature in view of the weight factor in airplanes, for example, and it makes the device easily portable rather than merely mobile, as in other types of heating devices now in use and therefore makes it more usable for almost any type of heating for which there is a demand.

In addition, it is an object to provide an arrangement such as above disclosed which has means responsive to altitude pressures, restricting the exhaust flowing from the heat exchanger and thereby substantially maintain the density of the hot gases in the heat exchanger, such an arrangement resulting in substantially maintaining the internal heat transfer rates regardless of ambient altitude or ambient pressure in which the device is operating. This results in the device having as great utility at high altitudes where there is low outside air pressure as it does at ground levels.

It is a further object of the invention to provide a device having a modified construction, and primarily intended for ground level operation, in which the heat from the heat exchanger is utilized in preheating the air passing through the compresssor. It is also an object to provide an arrangement in which the heat in the exhaust gases from the prime mover (hereinafter referred to generally as an engine or as a two-cycle internal combustion engine) is utilized to preheat and vaporize the fuel for the heat exchanger, the arrangement incidentally providing for complete consumption in the heat exchanger of any unburned gases coming from the engine.

It is an object to provide a construction having particular application as an altitude heater in which there are means automatically regulating the speed of operation responsive to the altitude. In this connection it is a feature to provide exhaust ports in the engine which are reduced in area and, more particularly, height in proportion to the intake ports for two reasons—(1) to enable the mean effective pressure in the engine combustion chamber to be maintained consistently, and (2) to throttle the engine back when operating at sea level to a predetermined point. The "throttling back" effect is accomplished by poor scavenging which is the result of restricted exhaust ports. It is a feature in this connection that as the ambient pressure drops, the R. P. M. of the engine increases in rough proportion due to better scavenging, which in turn is caused by greater differential pressure across the engine cylinder. Further, it is one of the principal objects of the invention, to accomplish two things by the above speed regulation—(1) to enable the compressor to maintain the pounds of air delivered in spite of the ambient pressure drop and (2) it enables the directly operated fan for circulating air over the heat exchanger to handle a sufficient increase in cubic feet per minute, resulting in consistent external heat transfer from the heat exchanger to the air being heated.

It is another object of the invention to provide a construction which is not ordinarily subject to backfire.

It is a still another object of the invention to provide a construction which enables a manual adjustment of flow to the heater by a valve construction provided for easier starting which in effect performs the same function as the conventional automobile engine choke.

It is an object to provide a device wherein the engine exhaust is used in the heat exchanger.

It is a primary feature of the present invention to provide a construction which is particularly adaptable for altitude use such as for heating the cabin of an airplane, and is equally adaptable for ground use or other use, as desired.

It is an object to provide a construction which is comparatively light in weight and may be readily transported from place to place by hand, which is compact and is embodied in a small housing. It is a feature to provide such a device which has an efficient and economical heat transfer means, and which is particularly adaptable to use in extremely cold climates for any type of auxiliary heating.

One of the principal features of the current invention is that it combines a heat exchanger and an internal combustion engine, and charges both with air compressed by the engine. In this connection, it is a feature that the regular piston of the engine performs the charging operation (said piston being of special shape as will be set out more fully hereafter) without the provision of a separate compressor or other device connected to the drive shaft of the engine or otherwise.

It is an object of the present invention that it may be used where it is necessary to introduce a blast of heated air, such for example as in heating cold airplane or automobile motors, or in thawing out pipes or for other such uses, where a blast of heated air may be played directly on the object to be heated.

It is an object of the present invention to provide a heat exchanger, a two-cycle internal combustion engine with a "stepped" piston providing air under pressure for charging both, said engine having an arrangement whereby it compresses air on each direction of the piston stroke, a carburetor, a pressure conduit, an accumulator for air pressure, an air inlet opening to the inlet side of the cylinder on both the upstroke and the downstroke of the piston, outlets leading from the cylinder to conduct the air under pressure from both said upstroke and the downstroke into said accumulator, a pressure line from said accumulator to said pressure conduit, a gas tank, a pressure line to said gas tank, a fuel line from said gas tank to said carburetor and means for regulating the flow of fuel into said carburetor, a Venturi unit in said pressure conduit leading to the inlet manifold of said gasoline or internal combustion engine, fuel conduit means discharging fuel for vaporization into said Venturi unit, a second Venturi unit leading to the fuel inlet manifold for said heat exchanger, a second fuel pipe leading from said carburetor, and discharging into said second venturi, means regulating the flow of fluid from said carburetor into each of said fluid conduits, and regulable means in said heat exchanger regulated with respect to the ambient air pressure whereby the pressure in said heat exchanger is so regulated that it will not be substantially affected by changes in ambient pressure in airplanes or the like, and an improved means of ignition of fuel in the heat exchanger and the engine. It is a purpose to disclose a construction wherein a magneto is used to ignite both the fuel in the firing chamber of the engine and the heater, without the use of a distributor, and thereby eliminate the bulk, weight, and expense of a distributor.

It is a further object to provide a device (similar to that above) in which the air inlet conduit for the air to be supercharged is preheated by the heat exchanger, and in which the fuel for the heat exchanger is preheated by the exhaust gases of the engine.

Other objects, the advantages and uses of the invention will become more apparent after reading the following specification and claims, and after consideration of the drawings forming a part of the specification, wherein:

Figure 1:
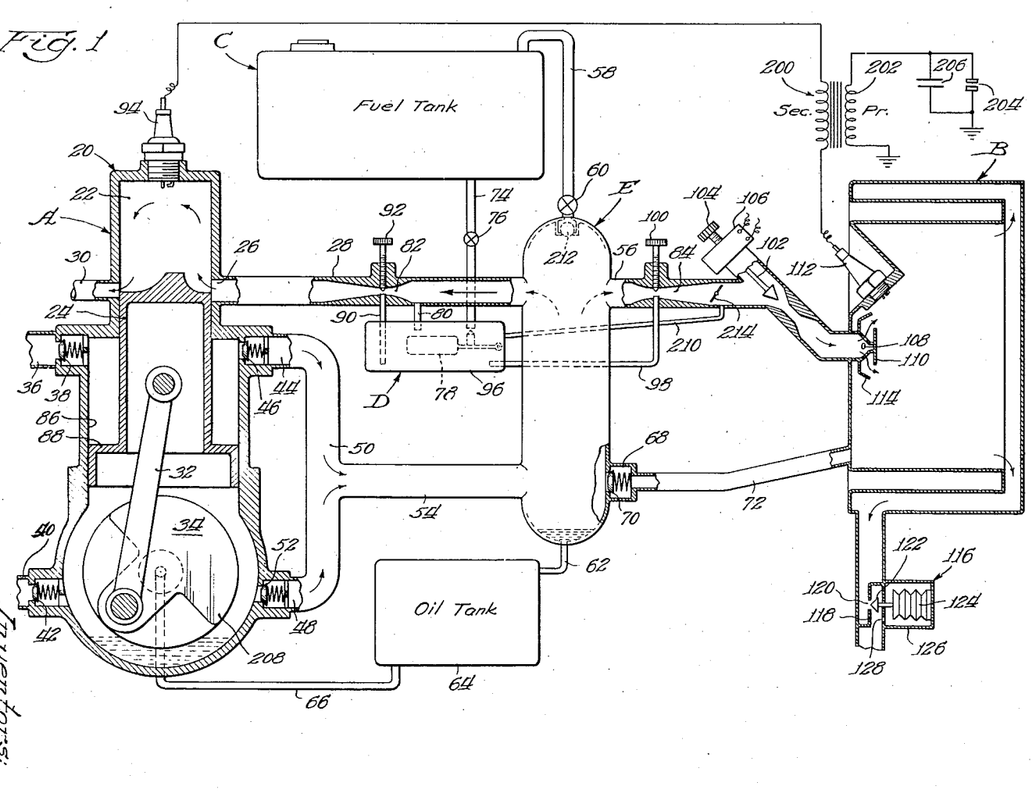
Fig. 1 is a schematic view showing, in one form, the present invention.
Figure 2:
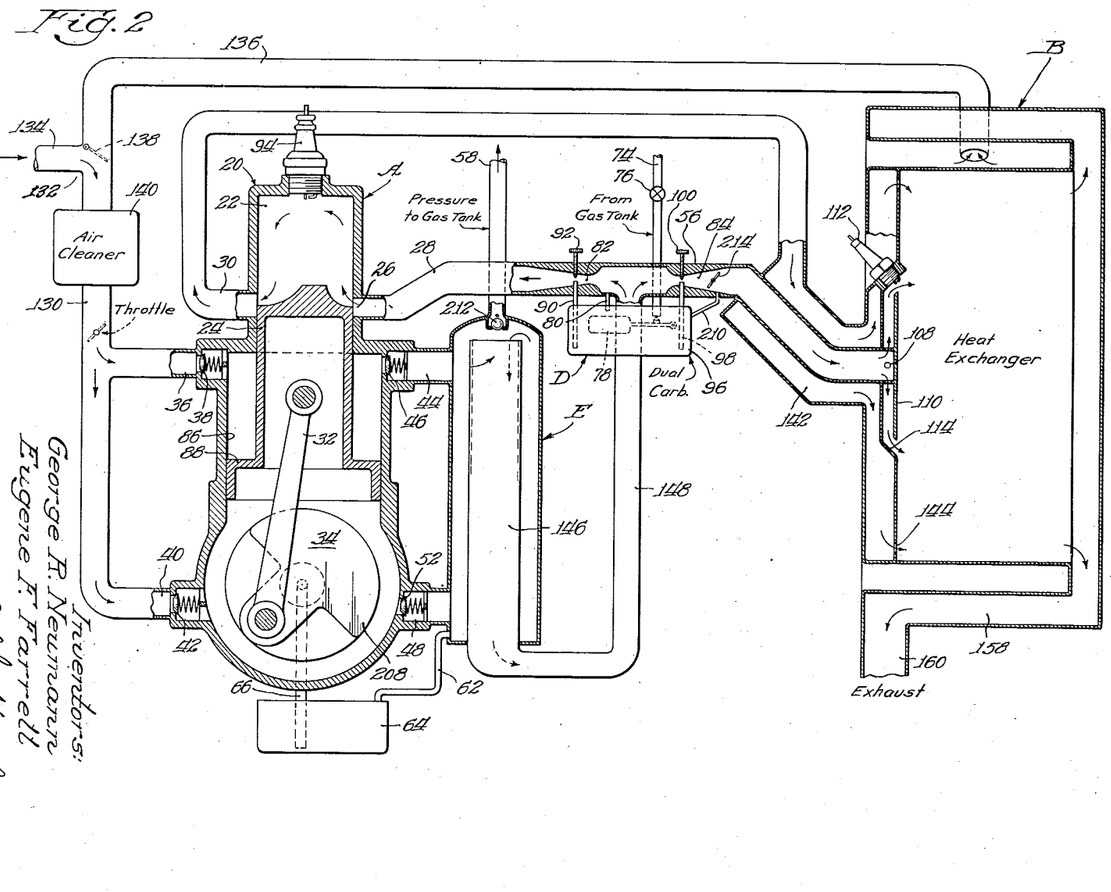
Fig. 2 is a view similar to that of Fig. 1, but showing a modified form of the present invention.

Referring more in detail to the construction shown in the various figures, and referring at first primarily to the schematic diagrams in Figs. 1 and 2, there is provided a prime mover here shown as a two-stroke cycle internal combustion engine A, and a heat exchanger B, preferably both having the same source of fuel C (being the fuel tank), a common carburetor D, and an accumulator E.

One of the principal advantages of the combination is that use is made of a light, two-stroke cycle gasoline or Diesel engine, which would ordinarily require a charging means, and which is equally as efficient at high altitudes as at sea level in the embodiment shown in Fig. 1.

There is herein disclosed a gasoline engine of the two-stroke cycle type herein usually called "two-cycle" type, and this engine is provided with a cylinder 20 having firing chamber 22, and in which cylinder 20 has mounted for reciprocation therein, a piston 24. This piston 24 is preferably peculiar in shape and is provided with what is herein referred to as a "step" or "stepped" portion 80. In other words, the piston is enlarged in diameter near its base, the cylinder bore in which the piston 24 reciprocates being enlarged in diameter at 86 below the firing chamber to accommodate the enlarged diameter of the piston, it being understood that only the upper or smaller diameter of the piston extends into the firing chamber. The firing chamber is provided with a fuel inlet charging manifold 26, which is in turn connected to the pressure conduit 28 through which the gases for combustion for the firing chamber 22 are furnished.

The engine is likewise provided with the firing chamber exhaust 30 from which the waste gases in the firing chamber (together with any unburned gases that may be left) are scavenged or exhausted. The piston 24 is provided with the usual connecting rod 32 which leads to the crank shaft 34 as is common with internal combustion engines.

The wall of the enlarged portion 86 of the engine cylinder bore is provided with the air inlet 36, there being a unidirectional valve 38 which prevents air being exhausted from the bore 86 through said inlet 36. It will thus be seen that on the downstroke of said piston, air is introduced into the enlarged bore of the cylinder through the inlet 36 and valve 38. On the upstroke, the valve 38 is closed and the air will be compressed, and will find other means for escape as hereinafter set forth.

Below the lower limit of movement of the piston 24, the wall of the crank case is provided with a second inlet 40 through which air is drawn on the upstroke of the piston 24 into the engine housing. This inlet 40 is likewise provided with a unidirectional valve 42, which may be identical with the valve 38 in form and design. On its other side, the cylinder wall is preferably provided with the outlet 44 by means of which the charged air in the cylinder above the step of the piston escapes on the upstroke of the piston. This outlet 44 is likewise provided with a valve 46, which is unidirectional and may be of the same style as the valve 38.

The outlet 48 leads from the crank case interior of the engine and is for the purpose of exhausting the air compressed on the downward movement of the piston 24. This outlet 48, as is true in the case of the outlet 44, is connected to the outlet manifold 50. The outlet 48 is likewise provided with a unidirectional valve 52, similar in construction to the valves 48, 42 and 46. The outlet manifold 50 in Fig. 1 conducts the gas or air compressed by movement of the piston in the cylinder bore 20, into the pressure pipe 54 which leads to the pressure accumulator E.

As will be apparent from Fig. 1, the accumulator E is connected to two pressure conduits 28 and 56 which lead respectively to the engine firing chamber and to the heat exchanger. It is understood, of course, that other arrangements of outlets to the pressure conduits may be provided, such for example as is shown in Fig. 2, and which will be hereinafter more fully described.

The accumulator E likewise has a fuel pressure pipe 58 which leads to the fuel tank, and places the fuel in the fuel tank under pressure. Valve means such as the valve 60 may be placed in said fuel pressure pipe 58 for the purpose of regulating the amount of pressure on the fuel in the fuel tank C, and is used especially for shutting off the flow of fuel when the heater is being transported from place to place. The accumulator E likewise is provided with a small oil return pipe 62, which returns oil that is trapped in the bottom of the accumulator back to the oil tank 64, and likewise places the oil in the oil tank under pressure from the accumulator. The oil tank 64 has an oil supply pipe 66 which leads to the engine, and forces oil into the bearings, the wrist pin bushing of the crank shaft, etcetera.

The accumulator E likewise is usually provided with means separating the crank case oil of the motor from the compressed air, whereby said oil is trapped and returned to the crank case. This is not entirely essential, however, as any oil carried by the compressed air would be burned with the other fuel in the heat exchanger and firing chamber of the engine should it reach them. In the latter event, however, oil consumption would be high and for that reason a trap may be provided. One suitable form of such trap is clearly shown in Fig. 2, and hereafter described in connection with said Fig. 2.

The accumulator E has an outlet 68 in which is located a unidirectional spring pressed valve 70. This outlet 68 connects to a conduit 72 which leads to the heat exchanger B. Air, which has been compressed, is conducted from the accumulator E through the outlet 68 and conduit 72 into the heat exchanger where it is used in the burning of the fuel. The conduit 72 likewise serves the purpose of balancing the air pressure in the carburetor.

The fuel tank C is provided with a discharge pipe 74 which leads to the dual carburetor D. This discharge pipe 74 is preferably provided with a valve 76, by which means the fuel can be cut off in its flow to the carburetor for transportation of the device. At its discharge end the pipe 74 extends into the carburetor bowl 96 and has an opening which is controlled by the float 78 in the usual manner, said float carrying a needle valve which extends against and into the end of the discharge pipe 74 and cuts off the flow of fuel when it is sufficiently high in the carburetor bowl 96. The carburetor bowl 96 receives air under pressure by means of the pressure pipe lead-in or reference tube 80 from the pressure conduit 28.

The air fuel ratio of the heat exchanger may be different than the air fuel ratio for the engine, and in fact the two are usually different. Each of the air fuel ratios may be separately regulated whereby the exact proportions for the engine firing chamber on the one hand, and the heat exchanger on the other, are easily maintained.

The pressure conduits 28 and 56 each contains Venturi means, comprising the venturis 82 and 84 respectively. The venturi 82 has a fuel jet 90 extending from the carburetor pump and discharging into the throat of the venturi. Means such as the needle valve 92 is provided for regulating the amount of the flow through the jet 90. The fuel from the jet 90 is carried by the pressure air stream in the pressure conduit 28 into the firing chamber 22 where it is fired by a spark plug 94 or other convenient means. Fuel from the carburetor bowl 96 is carried by means of the fuel pipe 98 to the pressure conduit 56, and is preferably discharged into the throat of the venturi 84 in a manner similar to that in connection with the venturi 82.

The needle valve 100 is used to regulate the supply of fuel discharged into the air stream passing through the venturi 84. The pressure conduit 56 is provided with the flow regulating or metering valve 102, which may be adjusted manually by means of the knurled head 104, in the manner apparent from the figures. A solenoid 106 likewise permits adjustment of the valve, so that it may be opened (for quick starting or to increase flow) by electrical means such as a thermostat or ordinary switch, when desired. The charging air from the accumulator, carrying the fuel from the pipe 98, is discharged into the heat exchanger B through the orifices 108, preferably against the baffle 110, from where they are directed into firing contact with the spark plug 112, or other means as desired. The rear baffle 114 throws the charged gases outwardly into the firing chamber of the heat exchanger B. It is understood that the device may be embodied in a construction having a plurality of heat exchangers, and is not necessarily limited to one heat exchanger. In such event additional discharge means would be needed, and the pressure conduit 56 would become manifold. The principle would be the same, however, and it would add nothing to encumber the case with additional drawings showing such manifold construction. It is believed sufficient to describe a simple heat exchanger in the embodiment disclosed.

The heat exchanger B in the embodiment primarily intended for use at various altitudes and having a possible variety of ambient air pressures, as disclosed primarily in the constructions illustrated in Fig. 1 is preferably provided with an automatic exhaust regulating means 116, which is here shown as comprising a baffle 118 in the exhaust pipe from the heat exchanger, said baffle having an opening 120, into which is extended the movable valve means comprising the valve head 122. This member 122 is preferably actuated by a bellows 124, which is carried in the box 126. This bellows 124 is subject to atmospheric pressure here shown as entering the box 126 through the openings 128.

It will be readily noted by examination of Fig. 1 in particular, that the valve opens the exhaust to its widest extent when the pressure on the bellows through the openings 128 is greatest. Thus at sea level the exhaust would be wide open, while at various altitudes the exhaust opening would be more restricted. This would tend to keep the hot gases at a regular pressure in the heat exchanger and system, so that the burning gases would be at what may be termed sea level pressures, regardless of the altitude of the plane or other device on which the heat exchanger is used. This prevents the creation of a substantial gas density which causes rapid loss of internal heat transfer rate to the heat exchanger with consequent loss of heat output, and also maintains the pressure existing throughout the system whereby a proper carburetion to both the engine and heat exchanger is secured.

It is understood that in the construction shown in Fig. 2 (intended primarily for ground level operation), the exhaust pressure regulator would not ordinarily be desirable. In this construction, the exhaust gases from the engine as hereinafter pointed out are directed into the heat exchanger in the preferred embodiment. Should the exhaust pressure be regulated, the burned gases in the firing chamber of the engine might not be properly exhausted thereby resulting in loss of power in the engine due to poor scavenging. Should the exhaust gases of the construction of Fig. 2 from the engine firing chamber be discharged into the outside atmosphere, then it would be possible to use the arrangement of Fig. 2 with the heat exchanger exhaust regulator.

Referring further to the construction illustrated in Fig. 2, there is shown a preferred embodiment in which greater use is made of the heat developed in the engine firing chamber and of the heat from the heat exchanger, in warming the combustion gases and motor. This construction is particularly desirable for use in extremely cold, ambient temperatures, such as may be encountered at either very high altitudes or in arctic climates. Here the intake pipe 130, connected to the intake manifold for the intakes 36 and 40, is provided with a T as shown at 132, one branch of which—the pipe 134— leads to a source of fresh air, such as atmospheric. The other branch of the T—the pipe 136—leads to the heat exchanger, and is opened to atmospheric near the surface of the heat exchanger, whereby the air entering the end of the pipe 136 is preheated by heat from the heat exchanger. A leaf valve 138 is positioned at the T whereby either the pipe 134 or the pipe 136 may be totally or partially blocked in a manner clearly apparent.

The air cleaner 140 in the intake pipe prevents dirt and grime entering the engine cylinder and oiling system. It is understood that an air cleaner would ordinarily be used in the construction of Fig. 1, but it is not deemed necessary to show it.

In the arrangement shown in Fig. 2, the exhaust from outlet 30 is carried from the engine firing chamber to the pressure conduit 56, and it is preferably passed around the outside of the conduit 56 in the overlying shell portion 142, and then discharged into the heat exchanger B through the openings 144. It is understood as above mentioned that such exhaust may be discharged outside the heat exchanger B for the purpose of using this construction in high altitude operations. However, for ground level use in the construction shown in Fig. 2, the gases from the chamber 22 will preheat and assist in vaporizing the fuel entering the heat exchanger through the conduit 56, and will themselves be discharged into the heat exchanger at 144, where they contribute the heat of the gases, and in addition any unburned gases (which are frequently present in supercharged engines of this type) will be burned in the heat exchanger.

In the modification herein disclosed, the accumulator E preferably is provided with a filter arrangement such as a trap or filter such as disclosed at 146, which removes any engine oil that may enter through the outlet 48. Further, the pressure from said accumulator may be carried by means of a conduit 148 to the junction of the conduits 28 and 56 (in the construction shown in Fig. 2), rather than have the conduits 28 and 56 lead directly from each side of the accumulator E as in Fig. 1. If any engine oil escapes into either conduit 56 or 28, it would be burned in the regular way by the engine firing and by the heat exchanger.

Both forms shown, in Figs. 1 and 2, are preferably provided with a special magneto arrangement of the high tension type, the circuit diagram for which is illustrated in the showing of Fig. 1 whereby the magneto provides the spark for both the engine firing chamber and the heat exchanger without the necessity of having a distributor. The magneto 200 is shown as provided with the primary 202 and the usual circuit interrupter or breaker 204. The secondary is connected on one side to the engine spark plug 94 and on the other side to the heater spark plug 112, both of which are grounded to the assembly. It is seen that the spark created when the voltage builds up in the secondary upon the demagnetization of the core coil by the interruption of the circuit in the primary 202 (by operation of the breaker 204 and condenser 206) flows through both spark plugs (which are connected in series) 94 and 112 to the ground whereby the charged gases in the firing chamber 22 and in the heat exchanger B are subjected to the spark, and thus ignited for proper combustion. The real feature of this construction is that both ends of the magnetic secondary coil are above ground.

It may here be mentioned that the charging of the firing chamber 22 of the engine may be accomplished with greater facility by regulating the length of the pressure tube 28, the size of the pressure tube 28, and the capacity of the accumulator E, so that the induced pressure wave caused by the closing of the port 26 against the onrushing compressed air, and which pressure wave rebounds and is conducted back through the tube 28 to the accumulator and then reflected back again toward the firing chamber 22, reaches the port 26 at the exact instant said port is open for charging for subsequent firing. This wave motion may likewise be coordinated with the pressure wave set up in the accumulator by the movement of the piston in the compressing operation, so that a considerably greater charging compression might be thereby introduced into the firing chamber.

Referring to Fig. 1, in the case of the altitude heater application, the exhaust ports of the engine are reduced in area and, more particularly, height in proportion to the intake ports for two reasons—

1. To enable the mean effective pressure in the engine combustion chamber to be maintained consistently.
2. To throttle the engine back when operating at sea level to a pre-determined point.

The "throttling back" effect is accomplished by poor scavenging which is a result of restricted exhaust ports. As ambient pressure drops, the R. P. M. of the engine increases in rough proportion due to better scavenging, which in turn is caused by greater differential pressure across the engine cylinder. The increase in engine speed accomplishes two things—

1. It enables the compressor to maintain the pounds of air delivered in spite of the ambient pressure drop and—
2. It enables the direct operated fan for circulating air over the heat exchanger to handle a sufficient increase in cubic feet per minute, resulting in consistent external heat transfer from the heat exchanger to the air being heated.

There is frequently a backfire in the system when the unit is shut off, due to the fact that the internal pressure drops rapidly and light ends of the fuel in the fuel storage tank surge through the pressure relief line from the fuel tank to the accumulator and from those back through the system to the heat exchanger where they are ignited. This occurs not only when the unit is shut off, but also whenever the pressure in the system drops rapidly for any other cause. To prevent this, and to prevent vapor locking of the fuel flow from the fuel tank C into the bowl 96 by the light ends of the fuel in the float bowl under vibration, the bowl 96 is vented to the down stream side of the heater venturi by the vent pipe 210, the pressure line 58 to the gas tank from the accumulator is provided with a ball check valve 212 which prevents back flow, and a butterfly valve 214 is placed in the pressure line 56 on the heater side of the venturi 84. The butterfly valve 214 is between the venturi and the discharge end of the pipe 210. The ball check valve prevents backfire, the air vent prevents the light ends of the fuel in the float bowl from vapor-locking the fuel flow into the float bowl and also stabilizes the air fuel ratio to the engine. The butterfly flow enables a manual adjustment of flow by operation of the valve to the heater, which provides for easier starting and in effect performs the same function as the conventional automobile engine choke.

Figures 3, 4:
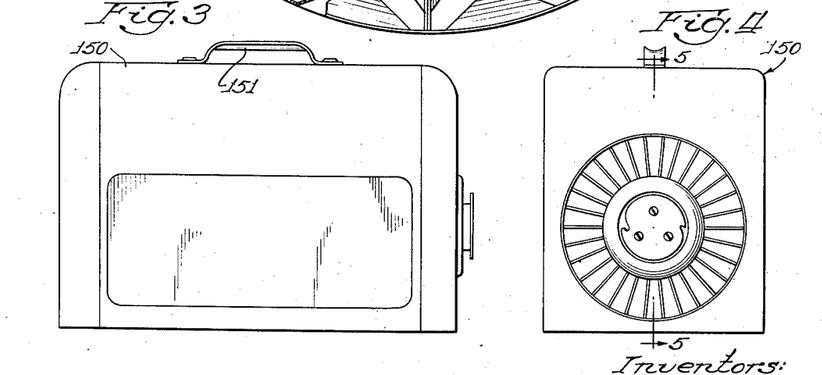
Fig. 3 is a side elevational view of a simple portable embodiment of the present invention.
Fig. 4 is an external end view of the device of Fig. 3, looking at the right-hand end of said figure.

Referring to the practical application of the invention herein disclosed, as shown in Figs. 3, 4, 5, 6, 7 and 8, and referring first to Figs. 3 and 4, there is provided a compact housing 150 for the unit. This housing 150 may, if desired, be provided with a handle or handles for manual transportation thereof. Such a handle is indicated in Fig. 3 at 151.

Figure 5:
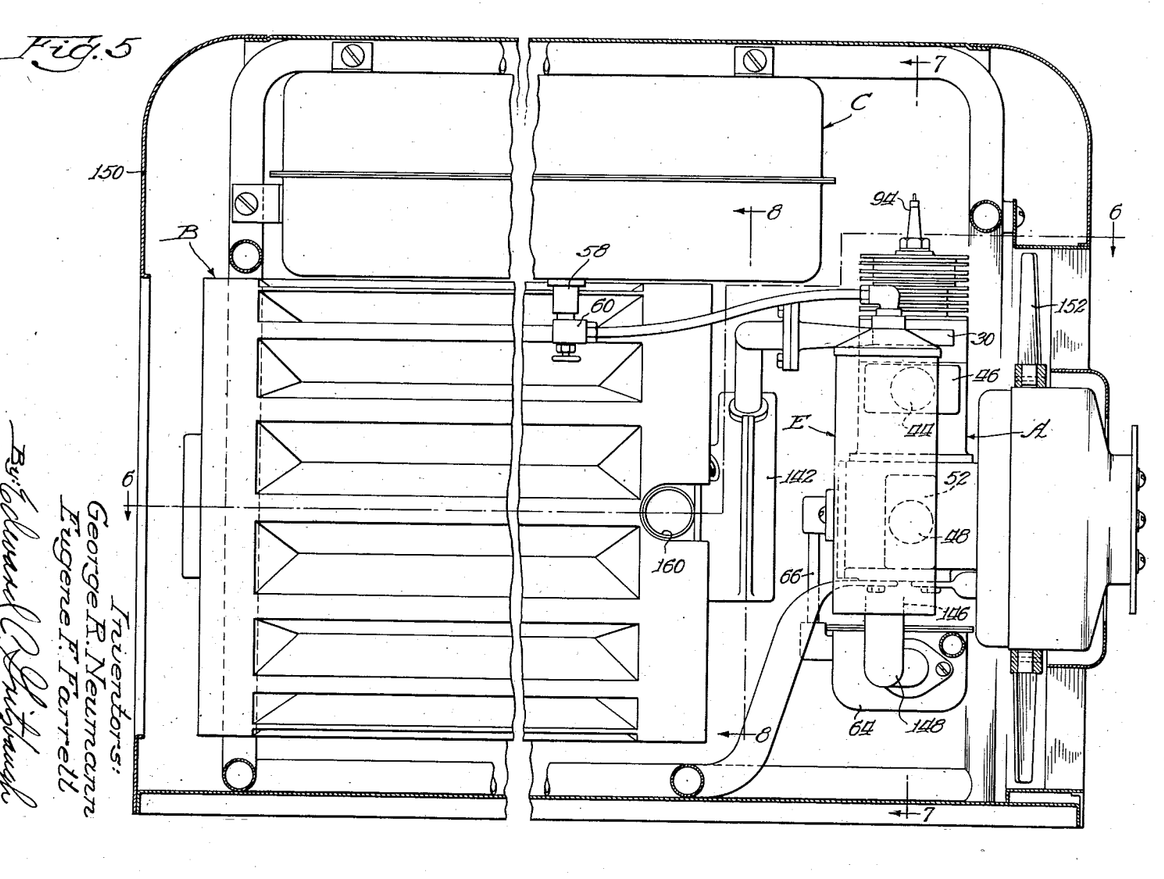
Fig. 5 is a sectional elevational view taken on the line 5—5 of Fig. 4, looking in the direction of the arrows and showing one embodiment of the invention.
Figure 6:
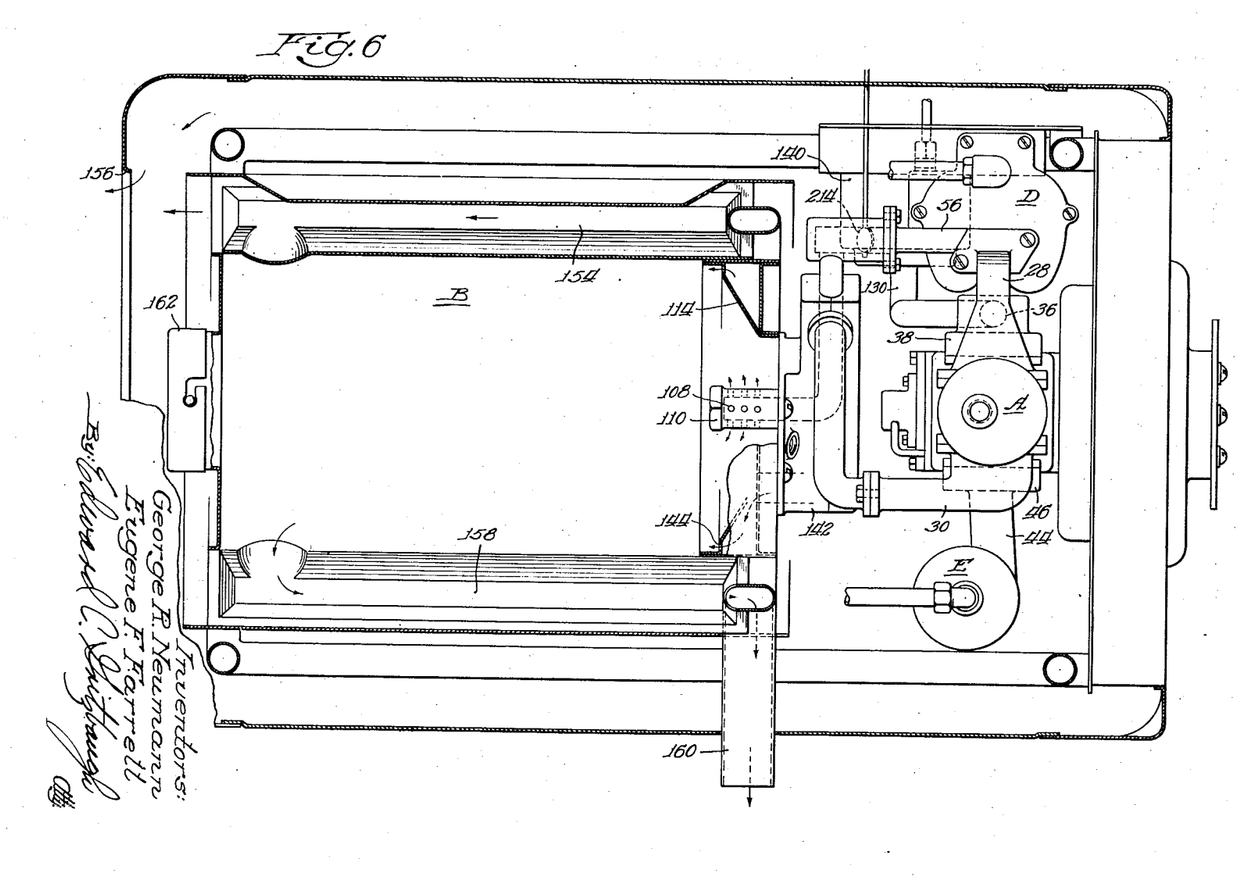
Fig. 6 is a plan view taken on the line 6—6 of Fig. 5, looking in the direction of the arrows.
Figure 7:
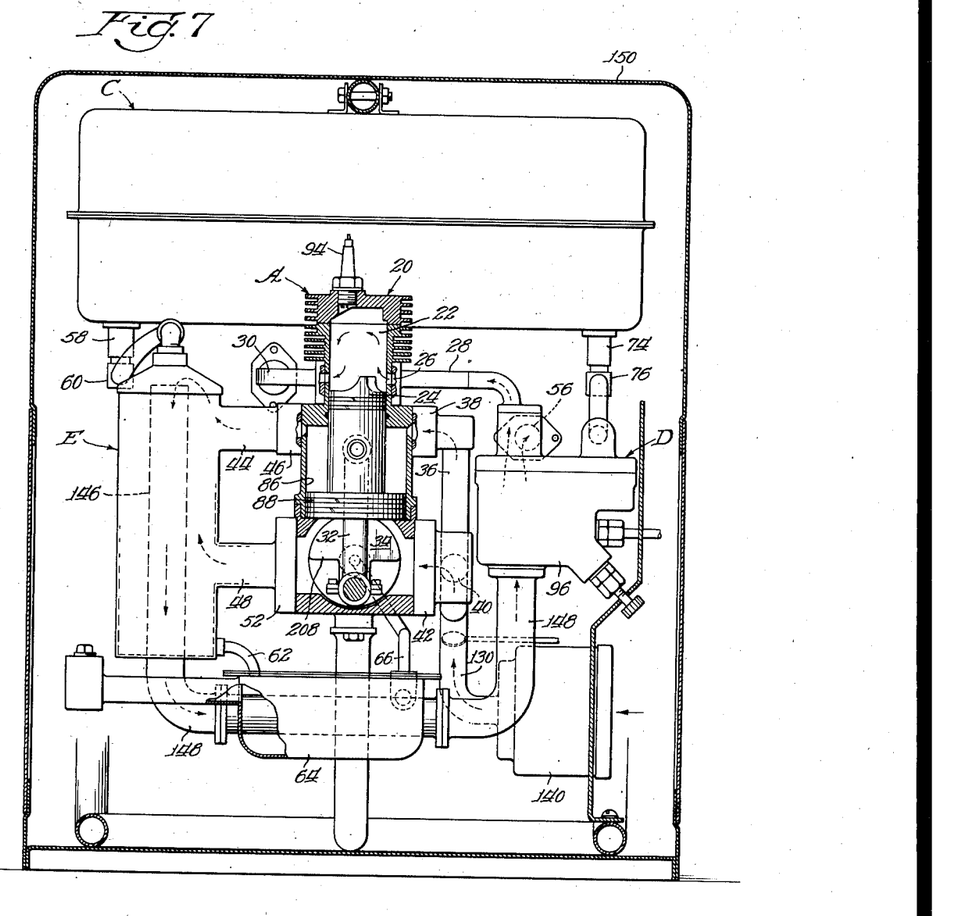
Fig. 7 is a view taken on the line 7—7 of Fig. 5, looking in the direction of the arrows.
Figure 8:
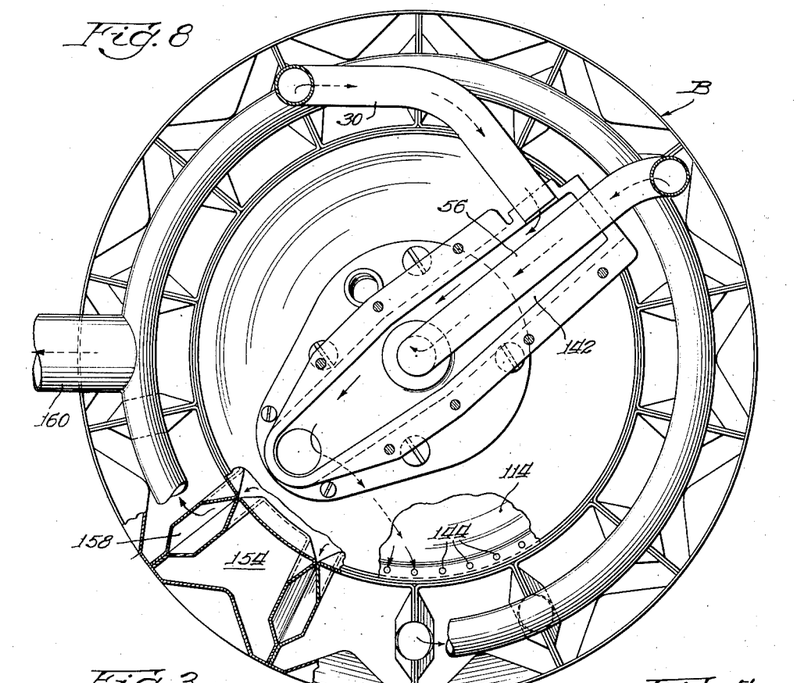
Fig. 8 is a view taken on the line 8—8 of Fig. 5, looking in the direction of the arrows.

As may be noted more clearly from Figs. 5 and 6, the heat exchanger and engine are both mounted inside the housing. An efficient cooling and air circulating fan 152 (see particularly Figs. 4 and 5) is mounted on the engine crank shaft, at one end of the housing, and circulates the cool outside air over the engine and into the heat exchanger in a manner which will be apparent from the drawings.

Air carried by said fan thus passes over the engine, cooling the engine, and then is introduced into the channel members 154 of the heat exchanger where it comes in contact with the various heating surfaces of said heat exchanger. The air may also in certain embodiments find its way around the space between the heat exchanger and the housing 150, and is discharged into the room through the opening 156 in the housing casing. The burned gases in the heat exchanger are exhausted through the exhaust passages 158 and exhaust pipe 160 which connects to the exhaust passages, said gases being carried in a circuitous route and thus having more wiping surfaces and more opportunity for loss of heat units, before reaching the exhaust outlet. (The details of this heat exchanger are disclosed in a companion case above mentioned.)

It is understood that the cap 162 may be removed from the firing chamber portion of the heat exchanger, and the hot exhaust gases may be thus short-circuited directly out through the openings 156 along with the fresh hot air. This is not objectionable where the heat exchanger is being used in the open air such as for thawing out frozen pipes out of doors, or for preheating an airplane engine before starting it, and will be more efficient in that the hot gases will be directly discharged onto the surface desired to be heated. For use in an enclosed space, such as a room or an airplane cabin, it is understood, of course, that the exhaust for the engine and the heat exchanger should ordinarily be discharged to the outside atmosphere.

In operation, the motor is started in the usual way, and air from the intake manifold is drawn into the engine housing through the inlets 36 and 40, where it is compressed by movement of the pistons 24 up and down in the cylinder 20, under the impulse of the firing in the chamber 22. This builds up the air pressure in the accumulator for the unit, by forcing the compressed air out through the outlets 44 and 48 into the outlet manifold 50 and pipe 54, and into the accumulator E. In the construction shown in Fig. 2, the outlet manifold 50 and part 54 are preferably omitted, and the outlets for the charged air discharge directly into the accumulator. The air under pressure in the accumulator is carried into the pressure conduits 28 and 56 where it picks up the fuel from the jets in the Venturi units, and it is conducted to the engine firing chamber and the heat exchanger respectively. The air pressure is also conducted through the pipe 58 into the fuel tank where it balances the fuel into the carburetor bowl 96. Pressure is likewise placed on the bowl fuel to force it through the fuel pipes 90 and 98.

The fuel entering the heat exchanger through the pressure conduit 56 is ignited as above described by the spark plug 112. Air entering the heat exchanger through the pipe 72 supplements the air in the firing chamber of the heat exchanger, and likewise prevents a dangerous pressure from developing in the accumulator E.

The form of construction shown in Fig. 2 is particularly advantageous for ground level or low altitude use, and is preferable for use in extremely cold climates. The use of the engine exhaust gases to assist in the vaporization of fuel entering the heat exchanger, and the use of heat exchanger heat from the tube 136—resulting in preheating the compressed air and thereby warming the engine crank case oil and the fuel in the carburetor—adds to the efficiency. In actual production, the entire unit weighs between thirty and forty pounds.

It is noted that the engine for both forms does not have to have much compression in the firing chamber. Another point should be mentioned here. The crank shaft assembly should be built up or filled in so that the connecting rod has barely room to clear the sides of the crank shaft. This fills the crank case space (leaving as little extra space as possible) whereby the cushioning effect of the air is substantially eliminated and a large portion of the compressed air is thus exhausted through the port 48. This filler is indicated in the schematic diagrams at 208 and may comprise metallic plates attached to the crank shaft alongside the connecting rod 32 and above the bearing portion, whereby a minimum of clearance is left for the connecting rod.

While we have described our invention in connection with certain specific embodiments thereof, it is to be understood that this is by way of illustration and not by way of limitation and the scope of our invention is defined solely by the appended claims which should be construed as broadly as the prior art will permit.

We claim:

1. A portable self-powered heating device comprising a heat exchanger adapted to heat ambient air and defining a combustion chamber, a prime mover, means furnishing fuel to both the prime mover and the chamber, independent air fuel ratio control means for the prime mover and the chamber, said prime mover serving as an air compressor, means conducting the air under pressure to both the prime mover and the chamber for operating the same, and means comprising a cooling fan for said engine blowing air to be heated by said heat exchanger over the heat radiating surfaces of said heat exchanger, whereby the heat from the engine is contributed to the heat from the chamber in warming the said air traversing said heat exchanger.

2. A portable self-powered heating device comprising a heat exchanger adapted to heat ambient air and defining a combustion chamber, a prime mover, means furnishing fuel to both the prime mover and the chamber, independent air fuel ratio control means for the prime mover and the chamber, said prime mover serving as an air compressor, means conducting the air under pressure to both the prime mover and chamber to heat the air traversing the heat exchanger, and means comprising a cooling fan for said engine blowing air to be heated by said heat exchanger over the heat retarding surfaces of said heat exchanger whereby the heat from the engine is contributed to the heat from the heat exchanger in warming the said air, and means comprising a magneto furnishing fuel igniting means to both said prime mover and said chamber substantially simultaneously whereby the need for a separate distributor is eliminated.

3. In a portable self-powered heating device comprising a heat exchanger adapted to heat ambient air and defining a combustion chamber, the combination of a prime mover, means furnishing fuel to both the prime mover and the chamber, independent air fuel ratio control means for the prime mover and the chamber, said prime mover serving as an air compressor means conducting the air under pressure to both the prime mover and the chamber for operating the same, and means comprising a cooling fan for said engine blowing air to be heated by said heat exchanger over the heat radiating surfaces of said heat exchanger, whereby the heat from the engine is contributed to the heat from the chamber in warming the said air traversing said heat exchanger.

4. In a portable self-powered heating device comprising a heat exchanger adapted to heat ambient air and defining a combustion chamber, and a prime mover, those improvements which comprise the provision of means furnishing fuel to both the prime mover and the chamber, independent air fuel ratio control means for the prime mover and the chamber, the prime mover serving as an air compressor means conducting the air under pressure to both the prime mover and the chamber for operating the same, and means comprising a cooling fan for said engine blowing air to be heated by said heat exchanger over the heat radiating surfaces of said heat exchanger, whereby the heat from the engine is contributed to the heat from the chamber in warming the said air traversing said heat exchanger.

5. In a portable self-powered heating device, a heat exchanger adapted to heat ambient air and defining a combustion chamber, a prime mover, means furnishing fuel to both the prime mover and the chamber, independent air fuel ratio control means for the prime mover and the chamber, said prime mover serving as an air compressor, means conducting the air under pressure to both the prime mover and chamber to heat the air traversing the heat exchanger, and means comprising a cooling fan for said engine blowing air to be heated by said heat exchanger over the heat retarding surfaces of said heat exchanger whereby the heat from the engine is contributed to the heat from the heat exchanger in warming the said air, in combination with means comprising a magneto furnishing fuel igniting means to both said prime mover and said chamber substantially simultaneously whereby the need for a separate distributor is eliminated.

6. In a portable self-powered heating device comprising a heat exchanger adapted to heat ambient air and defining a combustion chamber, and a prime mover, those improvements comprising means furnishing fuel to both the prime mover and the chamber, independent air fuel ratio control means for the prime mover and the chamber, the prime mover serving as an air compressor, means conducting the air under pressure to both the prime mover and chamber to heat the air traversing the heat exchanger, means comprising a cooling fan for said engine blowing air to be heated by said heat exchanger over the heat retarding surfaces of the heat exchanger whereby the heat from the engine is contributed to the heat from the heat exchanger in warming the said air, and means comprising a magneto furnishing fuel igniting means to both the prime mover and the chamber substantially simultaneously whereby the need for a separate distributor is eliminated.

GEORGE R. NEUMANN.
EUGENE F. FARRELL.

REFERENCES CITED

The following references are of record in the file of this patent:

UNITED STATES PATENTS

| Number | Name | Date |
|---|---|---|
| 1,288,557 | Gates | Dec. 24, 1918 |
| 1,645,506 | McKee | Oct. 11, 1927 |
| 1,771,552 | Tower | July 29, 1930 |
| 1,989,421 | Kerrick | Jan. 29, 1935 |
| 2,112,391 | Anxionnaz | Mar. 29, 1938 |
| 2,201,854 | Curioni | May 21, 1940 |
| 2,226,611 | McCollum | Dec. 31, 1940 |
| 2,281,107 | McCollum | Apr. 28, 1942 |
| 2,285,672 | McCollum | June 9, 1942 |
| 2,327,202 | McCollum | Aug. 17, 1943 |
| 2,347,142 | Whitted | Apr. 18, 1944 |
| 2,357,403 | Heyman | Sept. 5, 1944 |
| 2,364,214 | Hess et al. | Dec. 5, 1944 |
| 2,379,016 | McCollum | June 26, 1945 |
| 2,384,468 | Holthouse | Sept. 11, 1945 |
| 2,388,969 | Hess et al. | Nov. 13, 1945 |
| 2,410,353 | McCollum | Oct. 29, 1946 |